United States Patent
Bok

[15] 3,677,153
[45] July 18, 1972

[54] CAMERA WITH PIEZOELECTRIC CRYSTAL FLASH IGNITION SYSTEM

[72] Inventor: Johannes Gerardus Bok, Emmasingel, Eindhoven, Netherlands

[73] Assignee: U.S. Philips Corporation, New York, N.Y.

[22] Filed: Sept. 24, 1969

[21] Appl. No.: 860,582

[30] Foreign Application Priority Data

Sept. 27, 1968 Netherlands..........................6813923

[52] U.S. Cl............................................95/11 R, 95/11.5 R
[51] Int. Cl........................................................G03b 19/02
[58] Field of Search.........................................95/11, 11.5, 53

[56] References Cited

UNITED STATES PATENTS 2,538,577  1/1951  McCarty...............................95/11.5
2,972,937  2/1961  Suits......................................95/11.5

Primary Examiner—John M. Horan
Assistant Examiner—Kenneth C. Hutchison
Attorney—Frank R. Trifari

[57] ABSTRACT

A camera comprising percussive means on the shutter blade for striking a piezoelectric crystal device and thereby producing an electric voltage for igniting flashlamps when the aperture of the lens is exposed by the shutter blade. The energy required for exposing the lens aperture and striking the crystal is provided by a spring that is tensioned by the film transport mechanism.

1 Claim, 1 Drawing Figure

Patented July 18, 1972
3,677,153
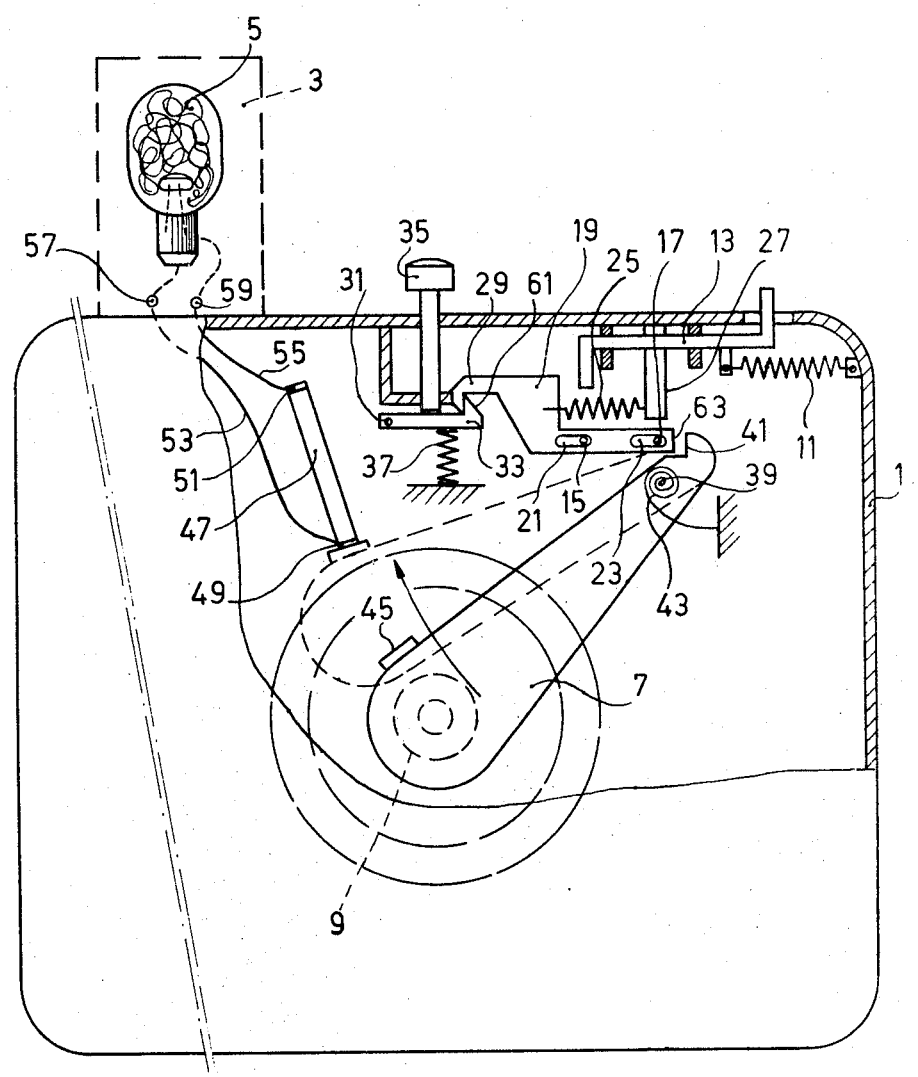
INVENTOR.
JOHANNES G. BOK
BY
AGENT

CAMERA WITH PIEZOELECTRIC CRYSTAL FLASH IGNITION SYSTEM

The invention relates to a camera comprising a percussion member coupled to the shutter operating mechanism for performing a percussion on at least one piezoelectric crystal secured in the camera, by which percussion an electric voltage is generated in the crystal for firing a flash lamp to be coupled with the camera. Such a camera is known.

The known camera comprises a built-in piezoelectric crystal and a percussion member which performs a percussion on the crystal by actuating the shutter operating mechanism. As a result of this percussion a high voltage is generated for a short period of time, by means of which a flash lamp of the combustible type as described, for example, in Dutch Pat. application No. 6,613,816 can be fired. In such a camera, the conventional voltage source formed by batteries or the like is not present.

In the known camera a rather complicated mechanism is used, so as to be sure that the firing of the lamp takes place at the desired instant with the shutter opened.

It is the object of the invention to provide a camera in which the movement of the percussion member cooperating with the piezoelectric crystal can be produced in a strongly simplified manner and a good firing of the lamp synchronized with the movement of the shutter blades is nevertheless ensured.

The camera according to the invention is characterized in that the percussion member is constituted by at least one of the shutter blades, or a mass directly coupled therewith, which exerts a percussion on the piezoelectric crystal during its movement when the lens aperture is released. The shutter blade itself covering the lens aperture may be formed as the percussion member. Alternatively, the shutter blade may cooperate indirectly with the crystal, for example, by arranging a rod between the blade and the crystal which rod receives the percussion from the blade and passes it on to the crystal. By these constructions the said synchronization between the instant of opening the shutter blade and the instant of the beginning of flashing can very readily be controlled.

According to an embodiment of the camera according to the invention, the energy required for moving the relative shutter blade and the performance of percussion on crystal is derived from a spring which can be tensioned by the film transport of the camera and which is relaxed by operating the shutter release. In contrast with the known camera in which all the energy required for opening the shutter and the percussion of the crystal is derived from a spring which is tensioned by depressing the shutter release, in the camera according to the invention a spring is tensioned by the film transport mechanism, and is relaxed by depressing the shutter release.

In order that the invention may be readily carried into effect, it will now be described in greater detail, by way of example, with reference to the accompanying drawing, the sole FIGURE of which shows one embodiment of a camera according to the invention.

In the diagrammatic drawing, reference numeral 1 denotes the housing of the camera. 3 and 5 denote a lamp holder with reflector and a high voltage flash lamp of the combustible type. The camera furthermore comprises a shutter blade 7 which in the rest condition covers the lens aperture 9. Furthermore a film transporting mechanism is present which is diagrammatically shown by means of a Z-shaped lever 13 coupled to a tension spring 11. A sliding member 19 can slide over the pins 15 and 17 over a distance which is determined by the elongate holes 21 and 23. A tension spring 25 is kept taut between said sliding member 19 and a pin 27 rigidly secured in the housing 1. This sliding member 19 comprises a hook-shaped portion 29 which in the position shown hooks behind a locking arm 33 which is pivotable about a shaft 31. The locking arm 33 together with the shutter release 35 engaging thereon is forced upwards by a compression spring 37. The shutter blade 7 which is pivotable about the shaft 39 comprises a stud 41 with which the right-hand end of the sliding member 19 can cooperate. The blade 7 is forced to the closed position by the spring 43. The shutter blade 7 furthermore comprises a plate-shaped portion 45 which, in the case of a studden rotation of the blade 7, strikes a piezoelectric crystal 47. With the crystal 47 suitably arranged in the path of movement of the plate-shaped portion 45, a short-lasting high voltage is produced as a result of said percussion between the end contact faces 49 and 51 which are connected to two conductors 53 and 55 which lead to the lamp holder contacts 57 and 59. These contacts are again coupled (in a manner not shown) with the current conductors from the flash lamp 5. The lamp is of a known type, for example, as described in Dutch Pat. application No 6,613,816; it is fired by the short application of a high voltage.

Generating the high voltage between the contacts 57 and 59 takes place as follows. First the lever 13 is pushed to the left, the sliding member 19 also moving to the left and engaging the oblique edge 61, the locking arm moving slightly downwards and hooking behind said arm. As a result of this the spring 25 is tautly stretched. When taking a picture, the release 35 is depressed, the locking arm 33 is pivoted, and the sliding member, forced by the spring 25, shoots to the right. The end 63 of said sliding member strikes the stud 41, as a result of which the blade is turned clockwise and strikes the end contact face 49 of the crystal 47 to be considered as an abutment while producing, for a short period of time, a high voltage between the end faces 49 and 51.

What is claimed is:

1. A camera comprising a lens, a lens aperture, a shutter blade for covering the lens aperture, and circuit means for igniting a flashlamp connectible to the camera, the improvement in combination therewith of a flashlamp ignition device comprising a piezoelectric crystal secured to the camera, said crystal having first and second contact faces electrically connected to the circuit means, a percussion element on the shutter blade, the shutter blade being pivotable between a closed position covering the lens aperture and an open position exposing the aperture, means for initially restraining the shutter blade in closed position and then urging the shutter blade to pivot to the open position, said restraining means comprising spring biasing means for urging said shutter blade to remain in said closed position, and a film transport means including a movable lever member which engages said spring means and loads the spring during the transporting of film, whereby said percussion element strikes said first contact face of the crystal and produces a voltage to ignite the lamp.

* * * * *